United States Patent
Ferencz et al.

(10) Patent No.: US 10,093,766 B2
(45) Date of Patent: Oct. 9, 2018

(54) 2K POLYURETHANE SYSTEMS WITH A HIGH GLASS-TRANSITION TEMPERATURE

(71) Applicant: Henkel AG & Co. KGaA, Duesseldorf (DE)

(72) Inventors: Andreas Ferencz, Duesseldorf (DE); Lothar Thiele, Langenfeld (DE); Tamara Schmidt, Oberhausen (DE); Konrad Becker, Duesseldorf (DE); Wolfgang Lupp, Duisburg (DE); Dustin Ullmann, Stuttgart (DE); Oliver-Kei Okamoto, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 795 days.

(21) Appl. No.: 14/467,550

(22) Filed: Aug. 25, 2014

(65) Prior Publication Data

US 2016/0362516 A1 Dec. 15, 2016

Related U.S. Application Data

(63) Continuation of application No. PCT/EP2013/053703, filed on Feb. 25, 2013.

(30) Foreign Application Priority Data

Feb. 28, 2012 (EP) ..................... 12157299
Feb. 28, 2012 (EP) ..................... 12157301

(51) Int. Cl.
| | |
|---|---|
| *C08G 18/48* | (2006.01) |
| *C08G 18/24* | (2006.01) |
| *C08G 18/20* | (2006.01) |
| *C08G 18/76* | (2006.01) |
| *C08G 18/79* | (2006.01) |
| *C08K 7/02* | (2006.01) |
| *C08J 5/24* | (2006.01) |
| *B29C 45/00* | (2006.01) |
| *B29C 45/17* | (2006.01) |
| *B29C 70/48* | (2006.01) |
| *B29K 75/00* | (2006.01) |

(52) U.S. Cl.
CPC ...... *C08G 18/4829* (2013.01); *B29C 45/0001* (2013.01); *B29C 45/1701* (2013.01); *B29C 70/48* (2013.01); *C08G 18/2027* (2013.01); *C08G 18/242* (2013.01); *C08G 18/7671* (2013.01); *C08G 18/797* (2013.01); *C08J 5/24* (2013.01); *C08K 7/02* (2013.01); *B29K 2075/00* (2013.01); *C08J 2375/08* (2013.01)

(58) Field of Classification Search
CPC ............. C08G 18/4829; C08G 18/242; C08G 18/7671; C08G 18/2027; C08G 18/797; C08K 7/02; C08J 5/24; C08J 2375/08; B29C 45/0001; B29C 45/1701; B29C 70/48

See application file for complete search history.

(56) References Cited

U.S. PATENT DOCUMENTS

| | | | |
|---|---|---|---|
| 5,071,939 A | 12/1991 | Fukami et al. | |
| 5,237,036 A | 8/1993 | Spitzer | |
| 6,103,851 A * | 8/2000 | Roser | C08G 18/0885 264/241 |
| 2005/0173830 A1* | 8/2005 | Thiele | C04B 26/16 264/240 |
| 2007/0167633 A1* | 7/2007 | Wershofen | C07D 229/00 548/202 |
| 2010/0120992 A1* | 5/2010 | Kamiyama | C07C 267/00 525/452 |
| 2010/0297427 A1* | 11/2010 | Schlingloff | C08G 18/3284 428/317.7 |
| 2013/0203935 A1* | 8/2013 | Thiele | C08G 18/089 524/590 |
| 2014/0371391 A1 | 12/2014 | Ferencz et al. | |

FOREIGN PATENT DOCUMENTS

| | | |
|---|---|---|
| EP | 0305140 | 3/1989 |
| EP | 1449863 | 8/2004 |
| EP | 1464661 | 10/2004 |
| EP | 2990429 A1 * | 3/2016 |
| JP | S63309510 A | 12/1988 |
| JP | H05155966 A | 6/1993 |
| JP | 2014506606 A | 3/2014 |
| JP | 2015512979 A | 4/2015 |
| WO | 2008110602 | 9/2008 |
| WO | 2009080740 | 7/2009 |
| WO | 2009150010 | 12/2009 |
| WO | WO 2009/150010 A1 * | 12/2009 |
| WO | 2010023060 | 3/2010 |
| WO | 2011067246 | 6/2011 |
| WO | WO 2012/097928 A2 * | 7/2012 |

OTHER PUBLICATIONS

International Search Report issued in connection with International Patent Application No. PCT/EP2013/053703 dated May 29, 2013.
EN ISO 2555, Jan. 2000.
DIN EN ISO 527, Jul. 2003.
DSC, DIN 11357, Mar. 2010.

* cited by examiner

*Primary Examiner* — Rabon Sergent
(74) *Attorney, Agent, or Firm* — James E. Piotrowski

(57) ABSTRACT

A two-component polyurethane composition with a viscosity of 20 to 3000 mPa·s (EN ISO 2555, 25° C.), containing i) 10 to 80 wt. % of at least one polyol with a number-average molecular weight of 200 g/mol to 3000 g/mol, ii) 5 to 70 wt. % of at least one polyisocyanate, iii) 0 to 10 wt. % of a catalyst, wherein the composition has an NCO:OH ratio of 2:1 to 1:2 and polyisocyanates are used, wherein 3 to 25 mol % of the NCO groups of the polyisocyanate are converted into carbodiimide and/or uretonimine. The two-component polyurethane compositions are used as matrix binders for fiber composite moldings.

14 Claims, No Drawings

2K POLYURETHANE SYSTEMS WITH A HIGH GLASS-TRANSITION TEMPERATURE

The invention relates to a two-component PU composition, namely a two-component composition based on a polyol component and an isocyanate component, wherein said composition is intended to be introduced at low viscosity into fiber-filled molds. In the crosslinked state, the composition is intended to have an elevated glass transition temperature.

Fiber-reinforced molded parts are intended to display elevated mechanical properties. It is necessary for this purpose for the matrix materials used to be stably connected to the fiber materials. Any defects have a negative impact on the mechanical properties of the molded parts. Accordingly, the corresponding part should as far as possible contain no blowholes, cavities and/or bubbles. Suitable matrix materials based on epoxy binders are known. However, these have various disadvantages, for example the systems are frequently too highly reactive. This may result in elevated exothermicity of the reaction mixture which can also impair the properties of the polymers. This is why other binders based on reactive 2-component polyurethane systems are being developed.

WO2008/110602 describes a PU adhesive composition which consists of a component containing compounds with acidic H atoms and a polyisocyanate component together with a trimerization catalyst for the isocyanates.

WO2011/067246 describes a resin system containing polyisocyanates, compounds with acidic H atoms reactive towards the polyisocyanate, a catalyst and a more highly functional acid. The acid must here be soluble in the compound with the reactive H groups.

WO2010/023060 describes a mixture of an isocyanate-reactive compound which contains a trimerization catalyst. The latter is obtained from phthalic acid or trimellitic acid by reaction with polyols, wherein specific quantity ratios must be maintained.

EP 0305140 describes a method for producing a rigid molded part with a PU composition, wherein the reactive mixture must contain polyisocyanates, polyols and a cyclic alkylene carbonate. In addition, a catalyst produced from tertiary amines and an alkylene carbonate is present.

WO2009/150010 describes a composition prepared from polyols with an isocyanate component, wherein the isocyanate component comprises at least 65% of the NCO groups as sterically hindered NCO groups. The composition is here intended for use as a matrix resin in fiber materials.

The above-stated compositions are frequently used to manufacture fiber-reinforced molded parts. Appropriate fiber materials are here laid in closed molds and said fiber materials are then enveloped with the above-stated materials as matrix resin. This can be assisted by various methods, for example by applying pressure, increasing the temperature or applying a vacuum. Since defects distinctly impair applicational characteristics, it is convenient for low-viscosity materials to be used.

It has been found that the viscosity of PU systems can be made very low at the start of the reaction. The binders are here intended to flow around the entire fiber content, since even small residual bubbles on the fibers, for example at intersections, weaken the molded part. However, since the corresponding molded parts may also be of relatively large dimension or have complicated shapes, it is necessary for the viscosity also to remain low for a period which is sufficient for filling the mold. Only under these circumstances is it possible to ensure that as few defects as possible occur in the matrix material if an elevated fiber filler content is to be achieved in the component. On the other hand, however, the composition should crosslink as quickly as possible in order to permit rapid demolding and ensure better mold utilization.

The above-stated known compositions comprise specific catalysts. These are intended to ensure that a crosslinking reaction of the isocyanate/OH groups is delayed. It is thus possible to delay the increase in viscosity of the compositions. However, in so doing, final crosslinking is also retarded. It is furthermore conventional for such catalysts to be present only in small quantities. They must accordingly be present in a proportion which is to be accurately measured as properties are otherwise insufficiently reproducible for industrial production.

A further requirement on the corresponding matrix binder is that, after crosslinking, mechanical properties remain constant regardless of external conditions. It has been found that one parameter which influences mechanical properties is the glass transition temperature ($T_g$). This can be influenced via selection of the polyols and the crosslink density, but without this being intended to have a negative impact on the viscosity required for processing. In particular, $T_g$ can be influenced via selection of the polyols or the crosslink density, but without this being intended to have a negative impact on the viscosity required for processing.

The object accordingly arises of providing a polyurethane binder system which has a low viscosity in the uncrosslinked state and maintains said low viscosity over an extended processing period. After crosslinking, matrix compositions should be obtained which have an elevated glass transition temperature. These mechanical properties should also be maintained under service conditions and any degradation of the crosslinked binder should as far as possible be avoided. In addition, the components should be individually stable in storage so ensuring reproducible manufacturing processes.

Said object is achieved by a two-component polyurethane composition with a viscosity of 20 to 3000 mPa·s (EN ISO 2555, 25° C.), containing i) 10 to 80 wt. % of at least one polyol liquid at 25° C. with a number-average molecular weight of 200 g/mol to 3000 g/mol, ii) 5 to 70 wt. % of at least one polyisocyanate, and optionally 0 to 10 wt. % of a catalyst, wherein the composition has an NCO:OH ratio of 2:1 to 1:2 and polyisocyanates are used, wherein 3 to 25 mol % of the NCO groups of the polyisocyanate are converted into carbodiimide and/or uretonimine.

The present invention also provides the use of such two-component PU compositions for producing fiber-reinforced molded parts. The present invention also provides methods for producing molded parts from fiber materials and such two-component PU compositions.

The two-component PU composition according to the invention consists of a polyol component and a crosslinking component. The polyol component contains at least one liquid polyol and optionally additives. The crosslinking component contains the isocyanates and optionally such additives as do not react with NCO groups.

Conventional polyol compounds known to a person skilled in the art should be used as the polyol component. A plurality of polyfunctional alcohols may be used for the purposes of the invention. These polyols should preferably have no further functional groups which are reactive with NCO groups, such as for example reactive amino groups. The compounds with a plurality OH groups may be those which bear terminal OH groups or they may be compounds which have lateral OH groups distributed along the chain. The OH groups are those which are capable of reacting with isocyanates, in particular primary or secondary OH groups are. Suitable polyols are those with 2 to 10, preferably with 2 to 6 OH groups per molecule. Mixtures of various polyols may be used, providing that an appropriate average functionality is obtained. The molecular weight should be from 100 to 3000 g/mol (number-average molecular weight $M_n$, measured by GPC), preferably from 200 to 1500 g/mol. Examples of suitable polyols are those based on polyethers, polyalkylenes, polyesters or polyurethanes. The polyols as a mixture should preferably assume liquid form at room temperature (25° C.), in particular each polyol individually is liquid.

Suitable polyols are, for example, liquid polyester polyols which may be produced by condensation of di- or tricarboxylic acids, such as for example adipic acid, sebacic acid and glutaric acid, with low molecular weight diols or triols, such as for example ethylene glycol, propylene glycol, diethylene glycol, triethylene glycol, dipropylene glycol, 1,4-butanediol, 1,6-hexanediol, glycerol or trimethylolpropane. A further group of such polyols to be used comprises the polyesters based on lactones, such as polycaprolactones. Such OH-functional polyesters are known to a person skilled in the art and they are commercially obtainable. Polyester polyols containing two or three terminal OH groups are particularly suitable. These polyester polyols should here have a molecular weight of up to 2000 g/mol, preferably in the range from 500 to 1000 g/mol.

It is, however, also possible to use polyester polyols of oleochemical origin. Such polyester polyols may for example be produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue. Examples of such polyols are castor oil or dimer diols. These oleochemical polyols should have hydroxyl values of 50 to 400 mg of KOH/g, preferably 100 to 300 mg of KOH/g, which corresponds to a molecular weight of approximately 250 to 2000 g/mol.

Further suitable polyester polyols are polycarbonate polyols. Polycarbonates may, for example, be obtained by the reaction of diols, such as propylene glycol, 1,4-butanediol or 1,6-hexanediol, diethylene glycol, triethylene glycol or tetraethylene glycol or mixtures of two or more thereof with diaryl carbonates, for example diphenyl carbonate, or phosgene. A further group of polyols to be used according to the invention are polylactones, for example polyesters based on ε-caprolactone. Suitable polyester polyols are also those which contain one or more urethane groups in the molecule chain.

Aliphatic polyols may also be used. These should have a functionality of 2 to 10, in particular of 2 to 6. They may be known polyols, such as ethylene glycol, propanediol, 1,4-butanediol, 1,5-pentanediol, 1,6-hexanediol, 1,7-heptanediol, 1,8-octanediol, 1,10-decanediol, 1,12-dodecanediol, dimer fatty alcohol, glycerol, hexanetriol glycerol, trimethylolpropane, pentaerythritol or neopentyl alcohol. "Sugar" alcohols may also be used. Suitable aliphatic alcohols have a molecular weight of 60 to 400 g/mol. In particular, however, linear alcohols with 2 to 30 C atoms are used, which comprise from two to four OH groups.

Polyether polyols, which are reaction products of low molecular weight, polyfunctional alcohols with alkylene oxides, are one particularly suitable group. The alkylene oxides preferably have 2 to 4 C atoms. The polyols may here be difunctional or more highly functional polyols, with polyols having 2, 3 or 4 OH groups being preferred. Examples are ethylene glycol, propanediol, butanediol, hexanediol, octanediol; polyfunctional alcohols, such as glycerol, hexanetriol, trimethylolpropane, pentaerythritol, neopentyl alcohol; sugar alcohols, such as mannitol, sorbitol or methyl glycosides. Corresponding aromatic polyols such as resorcinol, hydroquinone, 1,2,2- or 1,1,2-tris-(hydroxyphenyl)ethane may also be reacted with the alkylene oxides. Further polyols suitable for the purposes of the invention are obtained by polymerization of tetrahydrofuran (poly-THF). Random and/or block copolymers of ethylene oxide and propylene oxide may be used. Polyether polyols with 2, 3 or 4 OH groups are preferred. The polyether polyols are produced in a manner known to a person skilled in the art and are commercially obtainable.

Polyoxyethylene or polyoxypropylene diols or triols are preferred. The molecular weight of these polyethers may here range from approximately 200 up to 3000 g/mol, in particular up to 1000 g/mol.

Polyols which contain tertiary amino groups are preferably not present in the composition; they impair applicational characteristics. The functionality of the polyol mixture should be greater than 2.3, in particular from 2.5 to 4. In one embodiment of the invention, the composition is characterized in that polyester polyols and/or in particular polyether polyols with an average functionality of greater than 2.5 are used as polyols. If the crosslink density is inadequate, the crosslinked matrix binder does not have adequate mechanical strength.

Polyfunctional isocyanates are suitable as the polyisocyanates in the isocyanate component. The isocyanates preferably contain on average 2 to 5, preferably up to 4 NCO groups. Examples of suitable isocyanates are aromatic isocyanates, such as 1,5-naphthylene diisocyanate, 2,4- or 4,4'-diphenylmethane diisocyanate (MDI), xylylene diisocyanate (XDI), m- and p-tetramethylxylylene diisocyanate (TMXDI), the isomers of tolylene diisocyanate (TDI), di- and tetraalkyldiphenylmethane diisocyanate, 3,3'-dimethyl-diphenyl 4,4'-diisocyanate (TODI, 1,3-phenylene diisocyanate, 1,4-phenylene diisocyanate, 4,4'-dibenzyl diisocyanate; aliphatic isocyanates, such as hydrogenated MDI (H12MDI), 1-methyl-2,4-diisocyanatocyclohexane, 1,12-diiso-cyanatododecane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, butane 1,4-diisocyanate, hexane 1,6-diisocyanate (HDI), dimer fatty acid diisocyanate, dicyclohexylmethane diisocyanate, cyclohexane 1,4-diisocyanate, ethylene diisocyanate or phthalic acid bis-isocyanatoethyl ester.

Proportions of low molecular weight prepolymers may also be used, for example reaction products of MDI or TDI with low molecular weight diols, such as for example ethylene glycol, diethylene glycol, propylene glycol, dipropylene glycol or triethylene glycol. These prepolymers may be produced by reacting an excess of monomeric polyisocyanate in the presence of diols. The molecular weight of the diols is here generally below 1000 g/mol. Monomeric isocyanates may optionally be removed from the reaction product by distillation. Reaction products of such polyols with the NCO-modified diisocyanates may also be present. The quantity of these reaction products should be selected such that a sufficiently low viscosity of the composition is still obtained.

In one embodiment, aromatic diisocyanates are preferred according to the invention, while in another mixtures of aliphatic and aromatic isocyanates are preferably used. In particular, at least 50 mol % of the NCO groups should here originate from the isomers of MDI (2,2'; 2,4'; 4,4'). It is necessary according to the invention for the quantity of isocyanate groups to be reduced by reaction to yield carbodiimides and the derivatives thereof, in particular to yield uretonimine. Trifunctional uretonimine derivatives should here predominantly be present. The proportion of reacted NCO groups should amount to 3 to 25 mol % of the originally present NCO groups. The mixture of polyisocyanates should preferably be flowable at room temperature (25° C.). In order to obtain stable compositions, the isocyanate component should not contain any components which bring about any transformation of the NCO groups under storage conditions or conditions of use.

The two-component PU compositions according to the invention may additionally contain auxiliary substances which are preferably admixed wholly or partially with the polyol component. These substances are taken to mean those which are added generally in small quantities in order to modify the properties of the composition, such as for example viscosity, wetting behavior, stability, rate of reaction, bubble formation, storage life or adhesion, and also to adapt service characteristics to the intended application. Examples of auxiliary substances are leveling agents, wetting agents, catalysts, antioxidants, dyes, desiccants, resins and/or waxes.

The composition according to the invention may, for example, additionally contain stabilizers. "Stabilizers" should be understood for the purposes of the present invention to mean antioxidants, UV stabilizers or hydrolysis stabilizers. Examples of these are the conventional commercial sterically hindered phenols and/or thioethers and/or substituted benzotriazoles and/or amines of the "HALS" (Hindered Amine Light Stabilizer) type.

Catalysts may also be used. Catalysts which are used are the conventional organometallic compounds known in polyurethane chemistry, such as for example iron, titanium, zirconium, aluminum, lead, bismuth compounds or also in particular tin compounds. It is preferably possible for these catalysts to contain polyhydroxy compounds as a mixture or complex in the molar ratio of 0.25:1 to 2:1, said compounds being selected from cyclic α-hydroxyketones and/or triphenols with three adjacent OH groups. Cyclic α-hydroxyketones which may in particular be used are 5-, 6- or 7-ring compounds while 1-alkyl-substituted 2,3,4- or 3,4,5-OH derivatives may be used as triphenols. These are substances which act as complexing agents with the above-mentioned metal atoms. These complexing agents should here have a molar mass of below 500 g/mol or they may also be bound to a support. Substances suitable as complexing agents are in particular those which optionally comprise a further OH, COOH or ester group. During the crosslinking reaction, said complexing agents may accordingly also react with the reactive composition and be firmly incorporated into the matrix.

Another group of catalysts are those based on tertiary amines. Linear or cyclic aliphatic amines are for example suitable, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU) or diazabicyclononene (DBN).

The catalyst may be used in a quantity of 0.01 to around 5 wt. % relative to the total weight of the composition.

One embodiment of the two-component PU composition is characterized in that Sn, Ti or Bi compounds, in particular Sn catalysts with cyclic complexing agents selected from cyclic α-hydroxyketones or 1-alkyl-2,3,4-triphenol derivatives or cyclic tertiary amines, are present as the catalyst.

It is also possible for small quantities of plasticizers, coloring pastes or a molecular sieve to be present. Liquid compounds which scavenge moisture during storage may also be used as desiccants. The quantity of such components should, however, be below 10 wt. % (relative to the two-component composition). Preferably, no pigments, molecular sieves, fillers and/or plasticizers are present. The composition according to the invention should preferably contain no organic solvents. Substantially non-volatile compounds which are used in small quantities for dispersing or dissolving additives are not considered in this respect to be solvents.

Resins may furthermore optionally be present. These may be natural resins or synthetic resins. One particular embodiment uses resins containing OH groups, in particular resins with a plurality of OH groups. The latter are capable of reacting with the isocyanates. In a preferred embodiment, the quantity may amount to up to 15 wt. %.

The additives are so selected and the components added in such a manner that storage stability is ensured. In particular, no additives should be added, for example mono- or polyfunctional carboxylic acids, which promote the formation of gas bubbles such as $CO_2$ in the adhesive.

A preferred embodiment of the composition contains 30 to 70 wt. % of polyols with a functionality of greater than 2.5, in particular polyether polyols and polyester polyols, 70 to 30 wt. % of polyisocyanates, wherein 3 to 25 mol % of the NCO groups are converted into uretonimine, wherein in particular at least 50 mol % of all isocyanate groups originate from isomers of MDI, 0.1 to 5 wt. % of additives selected from stabilizers, catalysts and release agents, the sum of components being intended to amount to 100%. In particular, the mixture should contain no amine-containing components, such as catalysts or polyols.

In order to enable use according to the invention, a two-component PU composition according to the invention has a viscosity in mixed form of 20 to 3000 mPa·s (measured with Brookfield RTV, DIN ISO 2555), measured at a temperature of between 20 and 60° C. In particular, the viscosity should amount to 20 to 1000 mPa·s measured at 20 to 40° C. The two-component PU composition according to the invention may be applied at these temperatures. Viscosity should be determined directly after mixing, for example up to 2 minutes after mixing, the viscosity rising gradually due to the onset of the crosslinking reaction.

The two-component PU composition according to the invention may be put to varied uses in terms of processing. One embodiment has a long working time which is intended to exceed 60 minutes. Another embodiment has a pot life of over 10 minutes, after which very rapid crosslinking is observed. Working time should be taken to mean the time after which the viscosity of a mixture has risen to above 3000 mPa·s at 25° C. For more highly viscous mixtures (above 1500 mPa·s), the corresponding limit is above 5000 mPa·s. Working time may be influenced by selection of isocyanates and catalysts.

By selection of the components, the two-component PU composition according to the invention is intended to have a glass transition temperature ($T_g$) of above 60° C. (measured by DSC, DIN 11357), in another embodiment in particular of 100 to 130° C. The elevated $T_g$ is convenient in order to achieve the required mechanical stability of the cured composite system. Elevated mechanical stability of the composition is obtained by the selection according to the invention of the polyol and oligomeric isocyanate component. The structural stability of the matrix binder may, for example, be measured by means of the modulus of elasticity. The composition according to the invention ensures that, at temperatures of between −10° C. and +70° C., the modulus of elasticity is greater than 1000 MPa (in line with DIN EN ISO 527).

The two-component PU compositions according to the invention are suitable as a matrix resin for fiber-reinforced molded parts (composites). The compositions may here be used in various application methods, for example in the RTM method or in the infusion method.

The present invention also provides a method for producing composite materials in which the two-component PU compositions according to the invention are used. The compositions according to the invention are here applied by being introduced into a mold.

Known high-strength fiber materials are suitable as components of composite materials. Said fiber materials may for example consist of glass fibers; synthetic fibers, such as polyester fibers, polyethylene fibers, polypropylene fibers, polyamide fibers, polyimide fibers or aramid fibers; carbon fibers; boron fibers; oxide or non-oxide ceramic fibers, such as aluminum oxide/silicon dioxide fibers, silicon carbide fibers; metal fibers, for example of steel or aluminum; or of natural fibers, such as flax, hemp or jute. These fibers may be introduced in the form of mats, woven fabrics, knitted fabrics, laid fabrics, nonwovens or rovings. Two or more of these fiber materials may also be used as a mixture. Short chopped fibers may be selected, but long fibers, in particular woven and laid fabrics, are preferred. Such high-strength fibers, rovings, laid and woven fabrics are known to a person skilled in the art.

The fibers are here laid in the molds in a specified orientation. The quantity of fiber materials may be very high, in particular fiber contents of above 60% (volume-%) relative to the molded part are used. Still further inserts may optionally also be included. The premixed composition according to the invention is then introduced.

The method according to the invention comprises two embodiments. Inflow may be carried out rapidly by injection under pressure (Resin Transfer Molding or also RTM method), optionally also with vacuum assistance. Preferred compositions here are those which have a relatively short working time, but thereafter exhibit a rapid reaction. In another embodiment the mold is filled by application of a vacuum (infusion method). In this embodiment, a long open time is advantageous. The viscosity of a composition which is suitable according to the invention must be low and may increase only slightly under the method conditions of mold filling. According to the invention, the mixture of the composition, immediately after mixing, should be between 20 and 3000 mPa·s (EN ISO 2555, Brookfield viscometer, 25° C.), preferably below 1000 mPa·s. Care must here be taken to ensure that the flow rate is selected such that air or gases can escape from between the fiber materials.

In the embodiment for the infusion method, a long working time is particularly important, for which reason compositions containing no catalysts are in particular used in this embodiment. Inflow onto the fiber materials, displacement of air bubbles and mold filling may be carried out over an extended period. Thanks to the slow course or progress of the reaction, the fiber materials can be completely embedded in the matrix material.

In the embodiment as the RTM method, mold filling must proceed in a short time. The turbid reaction mixture is here introduced into the mold under pressure. The low initial viscosity ensures that the fibers are rapidly embedded. In this embodiment, the compositions preferably also contain catalysts. After a short time, the latter accelerate the reaction and full curing therefore proceeds rapidly. This may also be assisted by an elevated temperature. A short residence time in the mold is then possible.

Since a crosslinking reaction begins after mixing, it is convenient either for only the required quantities of mixture to be produced and directly processed or, in another approach, the PU mixture is produced continuously and introduced into the mold.

Once the mold has been filled, the composition begins to cure. This may proceed without additional input of heat. The heat of reaction arising from the crosslinking reaction does not result in localized overheating of the substrates. The filled mold may be heated in order to accelerate the crosslinking reaction. It may be heated to temperatures of up to 120° C., so ensuring faster crosslinking of the matrix material. The mold can thus be removed sooner from the molded part and is then available for further working operations.

The two-component PU compositions according to the invention are in particular suitable for embedding fiber materials, for example for the infusion method or for the RTM method. The known fiber materials are here arranged and embedded overall in a polymer matrix. Acceleration of curing may furthermore be achieved by targeted temperature control of the method and not directly by the specified composition. The composition exhibits good adhesion to fiber substrates. Thanks to the reduced viscosity, a defect-free matrix can be produced, in particular bubbles in the molded part are avoided. A further advantage is that a composition with elevated mechanical strength is obtained by selection of the isocyanate component. The compositions which are suitable according to the invention provide elevated mechanical stability after crosslinking as a composite part.

A further advantage of the composition is the elevated storage stability of the separately stored composition. Thanks to the chemical modifications of the NCO groups, the isocyanate component remains stable in storage for an extended period, no precipitation of individual components as turbidity or deposits is observed.

EXAMPLES

The following examples illustrate the invention.

Example 1

Component A
Polyether triol (amine-free, $M_n$ approximately 350)
Component B
4,4'-MDI (13% of the NCO groups as uretonimine)
NCO:OH ratio 1.2:1

Method: the components are mixed together with 0.05% Sn catalyst with exclusion of moisture in a vessel with a high-speed stirrer, the mixture thereafter being degassed under a vacuum with stirring. Viscosity (2 minutes): approximately 200 mPa·s Test specimens (4 mm) were cast from the mixtures and crosslinked for 45 minutes at 95° C. and 60 minutes at 150° C.
Modulus of elasticity <2200 MPa.

Example 2

Mixtures of the MDI with a fixed carbodiimide/uretonimine content are stored at different temperatures for a period of 3 or 6 months and checked for stability.

| 2,4'-/4,4'-MDI mixtures | Carbodiimide/ uretonimine content | 6 months at 12° C. | 3 months at 23° C. | 6 months at 23° C. |
|---|---|---|---|---|
| 50% 2,4'-MDI | 0% | sediment | turbid | turbid |
|  | 10% | OK | OK | OK |
| 35% 2,4'-MDI | 0% | turbid | turbid | turbid |
|  | 5% | OK | OK | OK |
|  | 10% | OK | OK | OK |

The tests reveal improved storage stability of the isocyanate component in the presence of carbodiimide/uretonimine.

What is claimed is:

1. A two-component polyurethane composition consisting of a polyol component and a polyisocyanate component, containing
   10 to 80 wt. % based on weight of the composition of the polyol component comprising at least one polyol with a number-average molecular weight of 200 g/mol to 3000 g/mol,
   5 to 70 wt. % based on weight of the composition of the polyisocyanate component comprising at least one polyisocyanate, wherein 3 to 25 mol % of the NCO groups of the polyisocyanate are converted into carbodiimides and/or uretonimine,
   0 to 10 wt. % based on weight of the composition of additives, the additives being present in the polyol component, the polyisocyanate component or both the polyol component and the polyisocyanate component,
   wherein the composition is free of polyester polyols and a mixture of the polyol component and the polyisocyanate component has an NCO:OH ratio of 2:1 to 1:2, a viscosity of 20 mPa·s to 3000 mPa·s (EN ISO 2555, 25° C.) immediately after mixing, and crosslinked products of the mixture have a glass transition temperature $T_g$ above 60° C.

2. The two-component polyurethane composition according to claim 1, wherein the mixture has a viscosity of below 1000 mPa·s (25° C.).

3. The two-component polyurethane composition according to claim 1, wherein MDI and the carbodiimide and/or uretonimine derivatives thereof are present as the polyisocyanate.

4. The two-component polyurethane composition according to claim 1, wherein polyether polyols with an average functionality of greater than 2.5 are used as polyols.

5. The two-component polyurethane composition according to claim 1, wherein the crosslinked products of the mixture have a glass transition temperature $T_g$ above 100° C.

6. The two-component polyurethane composition according to claim 1, wherein the additives are selected from the group consisting of stabilizer, catalyst, release agent, solvent, plasticizer, pigment, leveling agent, wetting agent, antioxidant, dye, resin and combinations thereof.

7. The two-component polyurethane composition according to claim 6, wherein the catalyst is a tertiary amine or a Sn, Ti, or Bi compound.

8. The two-component polyurethane composition according to claim 6, wherein the catalyst is a Sn catalyst with a cyclic complexing agent selected from cyclic α-hydroxyketone or 1-alkyl-2,3,4-triphenol derivative or cyclic tertiary amine.

9. The two-component polyurethane composition according to claim 1, characterized in that the composition is free of catalysts.

10. The two-component polyurethane composition according to claim 1, wherein the composition is free of solvents, plasticizers, carboxylic acids and pigments.

11. A method for producing fiber composite materials, wherein an external mold is filled with fiber materials and the two-component polyurethane composition according to claim 1 is introduced under pressure into said mold.

12. A method for producing fiber composite materials, wherein an external mold filled with fiber materials is provided and the two-component polyurethane composition according to claim 1 is introduced with application of a vacuum.

13. The method according to claim 11, wherein the fiber content amounts to greater than or equal to 60 volume-%, relative to the fiber composite material.

14. The method according to claim 13, wherein the mixture is crosslinked at a temperature of up to 120° C.

* * * * *